United States Patent
Pfitzer

(10) Patent No.: US 9,190,871 B2
(45) Date of Patent: Nov. 17, 2015

(54) DISTRIBUTED ENERGY SYSTEM DISCONNECT SWITCH WITH MECHANICAL ISOLATION

(75) Inventor: Hans-Erik Pfitzer, Chesterfield, VA (US)

(73) Assignee: THOMAS & BETTS INTERNATIONAL, LLC, Wilmington, DE (US)

(*) Notice: Subject to any disclaimer, the term of this patent is extended or adjusted under 35 U.S.C. 154(b) by 609 days.

(21) Appl. No.: 13/479,867

(22) Filed: May 24, 2012

(65) Prior Publication Data

US 2013/0099567 A1 Apr. 25, 2013

Related U.S. Application Data

(63) Continuation-in-part of application No. 13/276,406, filed on Oct. 19, 2011, now Pat. No. 8,716,885.

(51) Int. Cl.
*H02J 3/44* (2006.01)
*H01H 47/00* (2006.01)
*H02J 9/06* (2006.01)
*H01H 21/24* (2006.01)
*H02J 3/38* (2006.01)

(52) U.S. Cl.
CPC *H02J 9/06* (2013.01); *H01H 21/24* (2013.01); *H02J 3/383* (2013.01); *H02J 3/386* (2013.01); *H02J 2003/388* (2013.01); *Y02B 10/72* (2013.01); *Y02E 10/563* (2013.01); *Y02E 10/566* (2013.01); *Y02E 10/763* (2013.01); *Y10T 307/391* (2015.04); *Y10T 307/696* (2015.04); *Y10T 307/76* (2015.04)

(58) Field of Classification Search
CPC ...... H01H 21/24; H02J 9/06; H02J 2003/388; H02J 3/383; H02J 3/386; Y02E 10/563; Y02E 10/566; Y02E 10/763
USPC .............................. 307/29, 115, 80
See application file for complete search history.

(56) References Cited

U.S. PATENT DOCUMENTS

| | | | | |
|---|---|---|---|---|
| 4,065,711 A | * | 12/1977 | Kawabata | G01S 13/422 307/66 |
| 4,782,241 A | * | 11/1988 | Baker | H02J 9/062 307/66 |
| 5,210,685 A | * | 5/1993 | Rosa | H02J 9/062 307/64 |
| 5,229,651 A | | 7/1993 | Baxter, Jr. et al. | |
| 5,555,182 A | | 9/1996 | Galm | |
| 6,219,623 B1 | | 4/2001 | Wills | |
| 6,567,253 B1 | | 5/2003 | Herwig et al. | |

(Continued)

FOREIGN PATENT DOCUMENTS

EP 1 965 483 A1 9/2008

*Primary Examiner* — Rexford Barnie
*Assistant Examiner* — Elim Ortiz
(74) *Attorney, Agent, or Firm* — Snyder, Clark, Lesch & Chung, LLP

(57) ABSTRACT

A switching assembly includes a first terminal and a second terminal, and a contactor connected to the first terminal, where the contactor includes a relay switch and a coil. The switching assembly further includes a first switch connected to the second terminal, and a rectifier bridge connected in series between the contactor and the first switch. The switching assembly also includes a control unit configured to selectively apply a control signal to the coil to cause the relay switch to open or close based on a voltage measured at the first terminal or based on a voltage drop measured across the rectifier bridge.

20 Claims, 15 Drawing Sheets

(56) References Cited

U.S. PATENT DOCUMENTS

| | | |
|---|---|---|
| 6,810,339 B2 | 10/2004 | Wills |
| 6,850,074 B2 | 2/2005 | Adams et al. |
| 6,914,763 B2 | 7/2005 | Reedy |
| 6,963,802 B2 | 11/2005 | Enis et al. |
| 7,138,728 B2 | 11/2006 | LeRow et al. |
| 7,146,256 B2 | 12/2006 | Hibi et al. |
| 7,262,520 B2 | 8/2007 | Nguyen et al. |
| 7,332,827 B2 | 2/2008 | Nielsen |
| 7,376,491 B2 | 5/2008 | Walling et al. |
| 7,408,268 B1 | 8/2008 | Nocentini et al. |
| 7,447,568 B2 | 11/2008 | Christensen et al. |
| 7,462,946 B2 | 12/2008 | Wobben |
| 7,521,825 B2 | 4/2009 | Lasseter et al. |
| 7,545,053 B2 | 6/2009 | Yoshikawa et al. |
| 7,612,466 B2 | 11/2009 | Skutt |
| 7,729,811 B1 | 6/2010 | Weir et al. |
| 7,800,248 B2 | 9/2010 | Krämer et al. |
| 7,834,479 B2 | 11/2010 | Capp et al. |
| 7,851,934 B2 | 12/2010 | Nyborg |
| 7,859,125 B2 | 12/2010 | Nielsen et al. |
| 7,911,072 B2 | 3/2011 | Nyborg |
| 7,915,760 B2 | 3/2011 | Evans, Sr. |
| 7,920,942 B2 | 4/2011 | Lasseter et al. |
| 7,925,552 B2 | 4/2011 | Tarbell et al. |
| 7,933,689 B2 | 4/2011 | Warren et al. |
| 8,232,679 B2 * | 7/2012 | Bobb ............ H02J 9/062 307/85 |
| 8,716,885 B2 * | 5/2014 | Pfitzer ............ H02J 3/14 307/11 |
| 2002/0130556 A1 * | 9/2002 | Hohri ............ H02J 9/061 307/65 |
| 2003/0062774 A1 * | 4/2003 | Escobar ............ H02J 3/01 307/64 |
| 2004/0164617 A1 | 8/2004 | Bobb et al. |
| 2006/0238929 A1 | 10/2006 | Nielsen |
| 2008/0150282 A1 | 6/2008 | Rebsdorf et al. |
| 2009/0079193 A1 | 3/2009 | Nielsen et al. |
| 2009/0174187 A1 | 7/2009 | Nyborg |
| 2010/0042344 A1 | 2/2010 | Heber et al. |

\* cited by examiner

MAINTENANCE MODE

MECHANICAL ISOLATION MODE

DISTRIBUTED ENERGY SYSTEM DISCONNECT SWITCH WITH MECHANICAL ISOLATION

RELATED APPLICATION

The present application is a continuation-in-part (CIP) of U.S. application Ser. No. 13/276,406, entitled "Disconnect Switch for Distributed Energy System" and filed Oct. 19, 2011, the disclosure of which is incorporated by reference herein in its entirety.

BACKGROUND

Currently, industrial countries generate most of their electricity in centralized utility power facilities, such as fossil fuel, nuclear, large solar power, or hydroelectric power plants. These centralized facilities usually transmit electricity over long distances to supply power to residences and businesses. Distributed energy generation is a recent innovation in which distributed energy resource (DER) systems are located very near where the energy is to be consumed, and typically entirely replace, or at least supplement, power supplied by the centralized utility power system. DER systems typically include small scale power generators that may supply power to one or more local residences and/or businesses. The close proximity of the DER systems to the energy consumer(s) reduces the amount of energy lost in transmitting electricity, and also reduces the size and number of power lines that must be constructed in the utility power system. DER systems may, in some instances, use renewable energy sources such as, for example, sunlight, wind and geothermal sources. The availability of cheap natural gas has also fueled the adoption of distributed energy generation using natural gas.

DETAILED DESCRIPTION OF THE PREFERRED EMBODIMENTS

Figure 1:
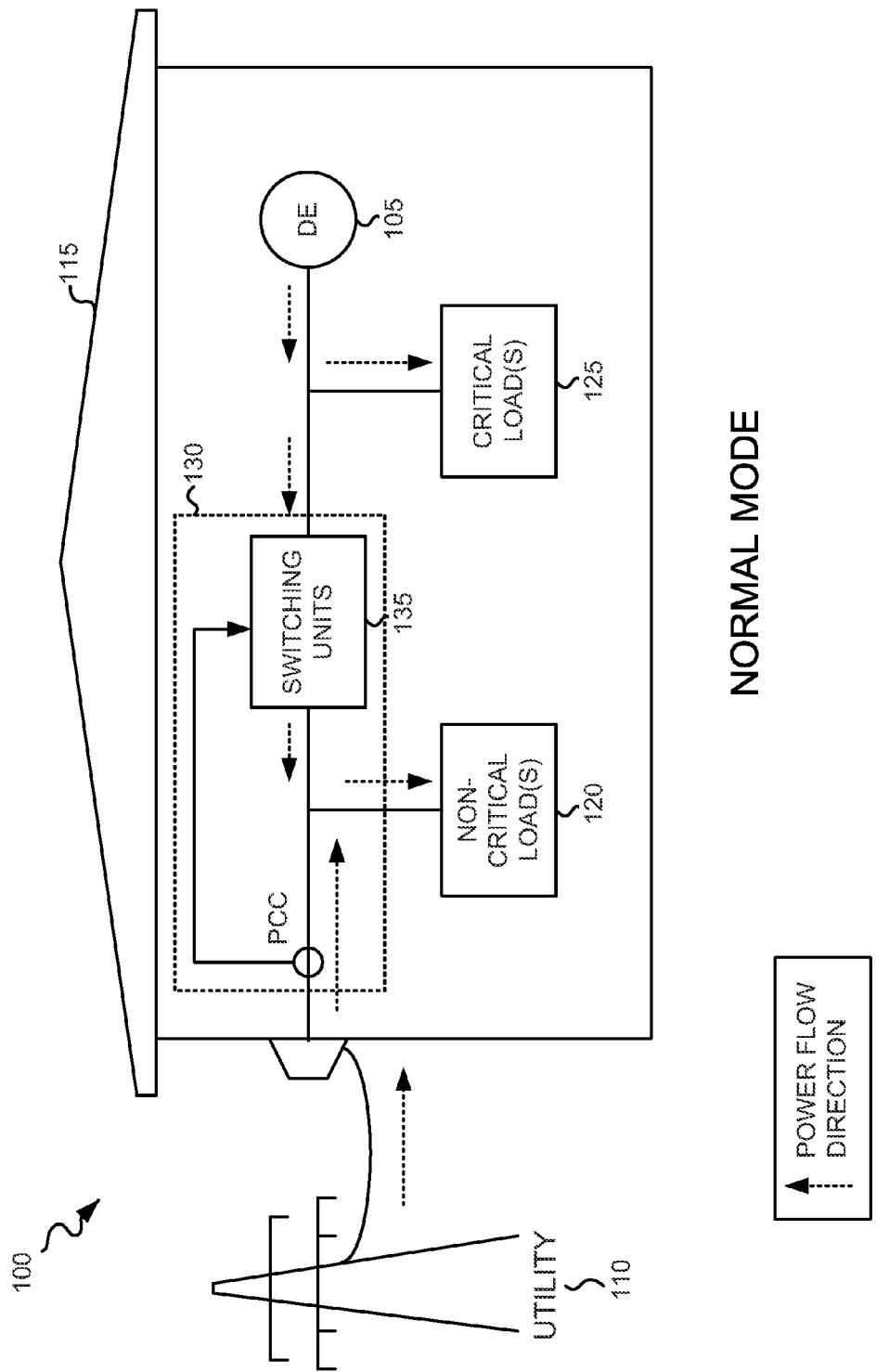
FIG. 1 is a diagram that illustrates an exemplary distributed energy system in which a distributed energy source, in conjunction with a utility power source, may be used to power loads at a business or residential location.

The following detailed description refers to the accompanying drawings. The same reference numbers in different drawings may identify the same or similar elements. The following detailed description does not limit the invention.

The emerging use of alternative energy has led to the burgeoning of distributed energy sources to support local loads and growing energy demands. The nature of alternative energy sources, such as wind and solar power, creates varying availability. Distributed energy systems also generate excess power when load requirements are not at peak levels, preventing full use of the energy generated since utility grids are not designed to accommodate generation and storage at the local distribution level. Additionally, powering loads when the distributed energy system requires maintenance necessitates the transfer to another energy source.

The integration of the local grid for distributed energy with the electrical power utility grid would enable the utility grid to supplement the distributed energy sources during periods of peak demand. Integration would also enable the utility grid to absorb excess capacity from the distributed energy source, where local regulations would allow it, when the demand is at less than peak levels. There have been few national standards for interconnection and testing for operation and certification, and fewer uniform building, electrical and safety codes, which has complicated the transition to the use and integration of distributed energy sources. The Institute of Electrical and Electronic Engineers' Standard for Interconnecting Distributed Resources with Electrical Power Systems, IEEE 1547, is one of the few nationally recognized standards that govern the integration of distributed energy systems with electrical power utility grids. The integration of the local grid with the utility grid provides the local grid with greater support and the utility grid with a source of additional energy, but can subject the local grid to failure when the utility grid fails, even when compliant with IEEE 1547.

The disconnect switch for distributed energy systems, described herein, meets the demand for a means of integrating local grids with utility grids that avoids subjecting local grids to failures in the utility grids. The disconnect switch enables the quick connection and disconnection of the distributed energy source and critical loads to and from the utility grid, anticipates power source failure, and makes necessary connections and disconnections without interruption of power through the use of silicon-con trolled rectifiers (SCRs). The disconnect switch can monitor voltages, currents, frequency and phase synchronization, can detect fault currents from both local and utility grids, and may automatically switch from distributed energy to utility grid sources within 20 milliseconds in response to indications of imminent power failure. The disconnect switch also can monitor and correct power reversals and back-feeding, and may automatically transfer excess energy generated by the distributed energy source to the utility grid or other, non-critical loads.

During normal operation, the disconnect switch transmits excess electricity from the distributed energy source to power non-critical loads or to be exported to the utility grid, when the distributed energy source powers critical loads. During instances when the utility grid is not operating, the disconnect switch operates in an island mode or a mechanical isolation mode, isolating the distributed energy source and critical loads from the utility grid and non-critical loads. When the distributed energy source is disabled (e.g., for maintenance), the switch transmits energy from the utility grid to power critical, as well as, non-critical loads. The mechanical isolation provided by the mechanical isolation mode of the disconnect switch further provides a redundant mechanism, overuse of the switch SCRs alone, that protects line workers on the side of the switch electrically connected to the utility grid.

FIG. 1 illustrates an exemplary distributed energy system 100 in which a distributed energy source, in conjunction with utility power, may be used to power loads at a business or residential location 115 (hereinafter referred to as "location 115"). As shown in FIG. 1, a utility power source 110 may supply power to location 115 to power one or more non-critical loads 120. As further shown in FIG. 1, location 115 may include a distributed energy (DE) source 105 that may supply power to one or more critical loads 125. A switching assembly 130 may include multiple switching units 135 (i.e., one switching unit per phase) for selectively switching, as described in further detail below, the flow of power from utility power source 110 and/or DE source 105, to non-critical load(s) 120 and critical load(s) 125.

Figure 2:
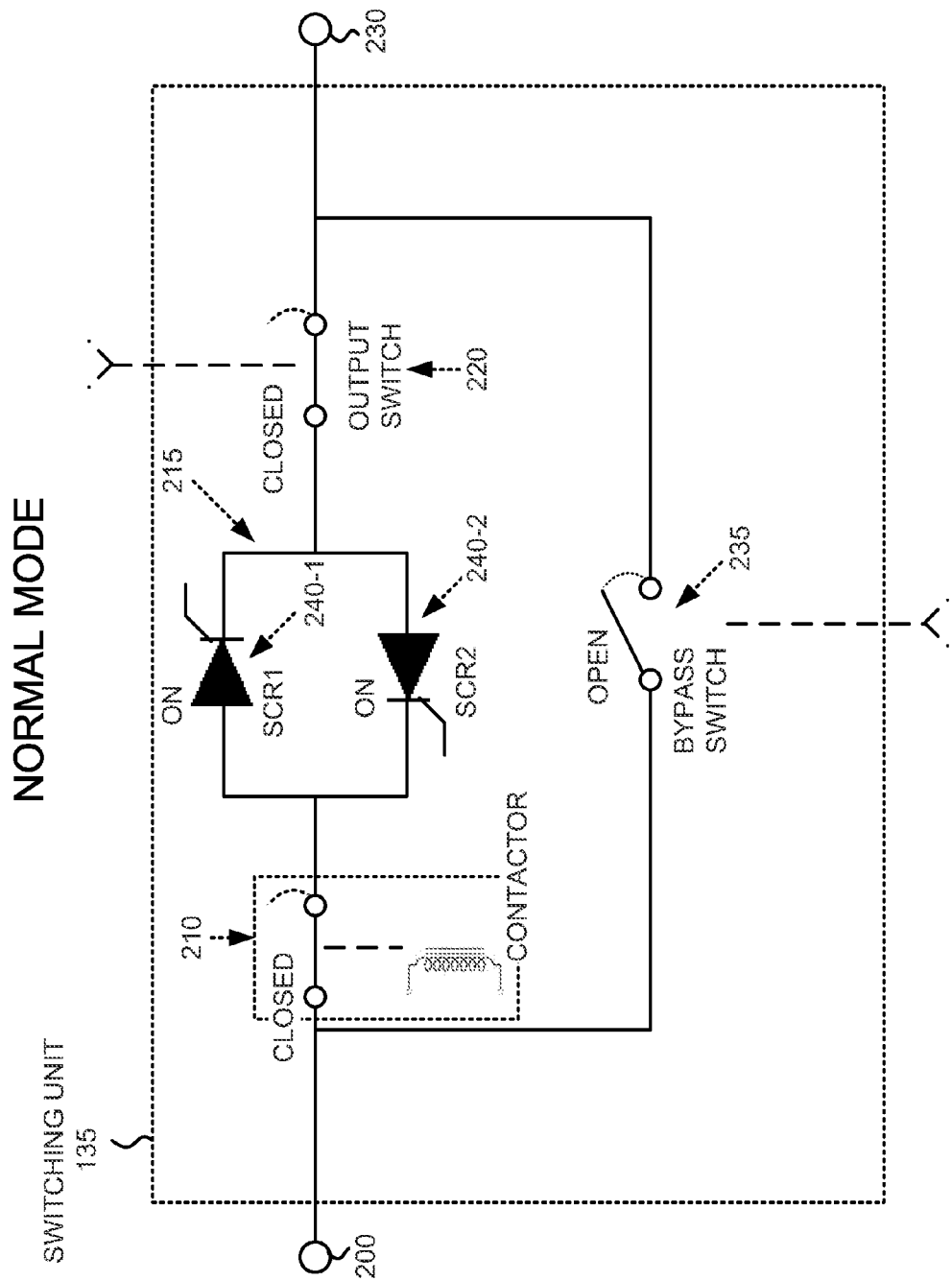
FIG. 2 is a diagram that depicts a switching unit operating during the normal operating mode shown in FIG. 1.

FIG. 1 depicts a "normal mode" in which utility power source 110 may supply power to non-critical load(s) 120 of location 115, and DE source 105 may supply power to critical load(s) 125, and may export excess power to utility power source 110 via switching assembly 130. Each switching unit 135 of switching assembly 130 may include switching circuitry (not shown) connected to a single phase of power being delivered by utility power source 110 and/or DE power source 105. FIG. 2 depicts a single switching unit 135 operating during the "normal mode" shown in FIG. 1. Switching assembly 130 of FIG. 1 may include a switching unit 135 for each phase. As can be seen in FIG. 2, an input terminal 200 of switching unit 135 connects to a contactor 210 which further connects to a SCR bridge 215. Contactor 210 may include a relay switch that opens or closed based on control signals applied to a contactor coil. SCR bridge 215 further connects to output switch 220 which, in turn connects to output terminal 230. Therefore, input switch 210, SCR bridge 215 and output switch 220 connect in series between input terminal 200 and output terminal 230. When opened, contactor 210 mechanically isolates SCR bridge 215, output switch 220 and output terminal 230 from input terminal 200 (i.e., mechanically isolates DE source 105 from utility power source 110).

As further shown in FIG. 2, a bypass switch 235 may connect between input terminal 200 and output terminal 230 in parallel across the series connected contactor 210, SCR bridge 215 and output switch 220. SCR bridge 215 may include a first SCR 240-1 and a second SCR 240-2 connected in parallel to one another. SCR 240-1 may have its anode connected to contactor 210 and its cathode connected to output switch 220. SCR 240-2 may have its cathode connected to contactor 210 and its anode connected to output switch 220. The gates of SCRs 240-1 and 240-2 may additionally connect to a control unit (connection not shown in FIG. 2) such that the control unit may apply control voltages to turn on or turn off SCRs 240-1 and 240-2. In other implementations, other types of fast acting semiconductor devices may be used in place of SCR bridge 215. For example, an insulated-gate bipolar transistors) (IGBT(s)) may be used instead of SCR bridge 215. Output switch 220 and bypass switch 235 may each, in some implementations, include a single pole, single throw switch. In other implementations, output switch 220 and bypass switch 235 may each include a contactor or a motorized breaker. In still other implementations, switches 220 and/or 235 may use triple pole, single throw switches for three phases. Additional implementations may use 1, 2, 3 or 4 pole switches.

As shown in FIG. 1, in the "normal mode," when utility power source 110 is delivering power to non-critical load(s) 120, and DE power source 105 is delivering power to critical load(s) 125 and through switching units 135 to non-critical load(s) 120 and utility power source 110, contactor 210 (as shown in FIG. 2) may be in a closed position, output switch 220 may be in a closed position, bypass switch 235 may be in an open position, and SCRs 240-1 and 240-2 may be turned on. With contactor 210 in a closed position, output switch 220 in a closed position, bypass switch 235 in an open position, and SCRs 240-1 and 240-2 turned on, power may flow from DE power source 105 into output terminal 230, through switching unit 135, and out input terminal 200 to non-critical load(s) 120 and utility power source 110.

Figure 3:
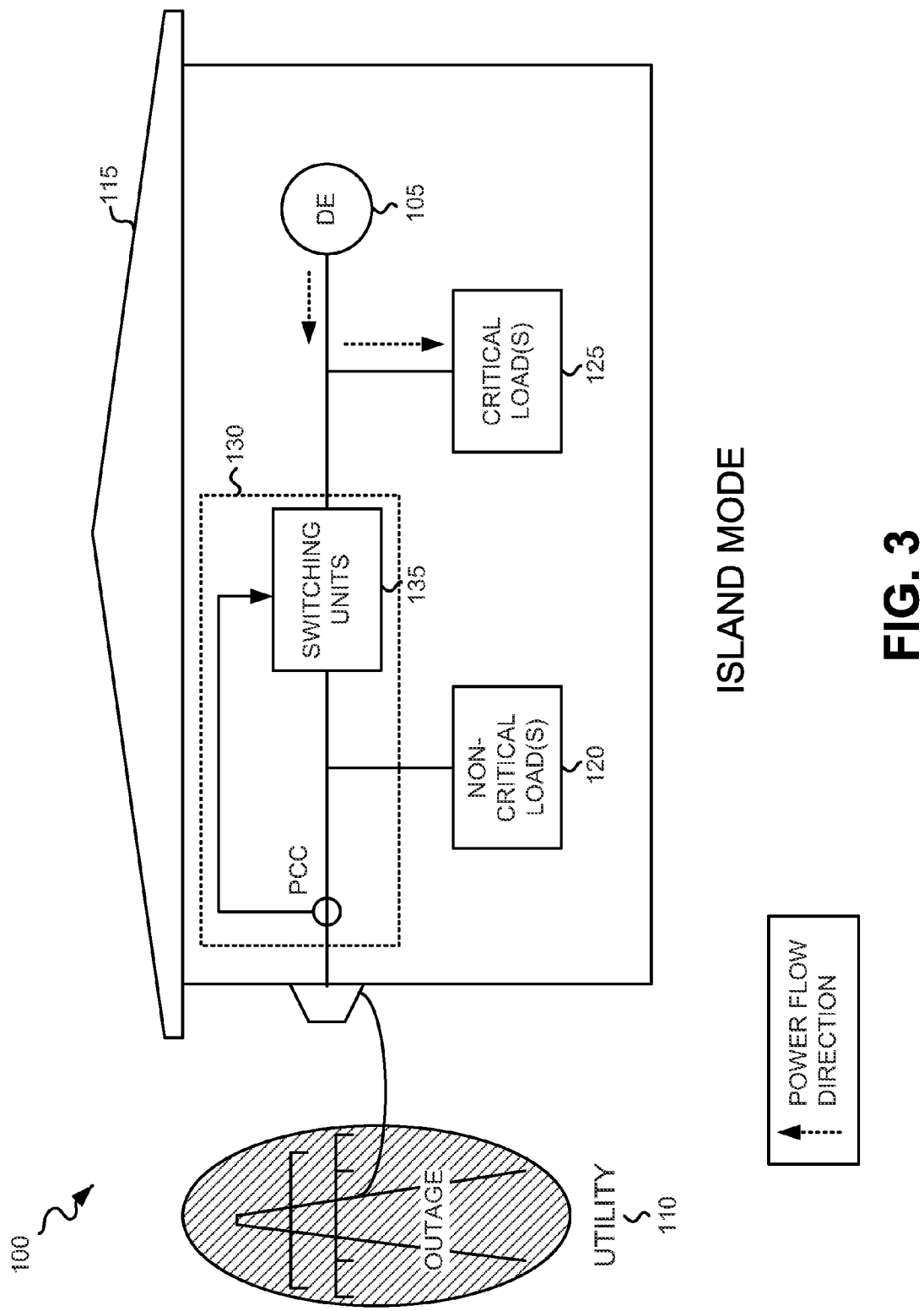
FIG. 3 is a diagram that depicts an "island" operating mode where the utility power source fails to supply power to the business or residential location, and switching units cause the distributed energy power source to continues to supply power to a critical load, but to discontinue exporting power to the utility power grid.
Figure 4:
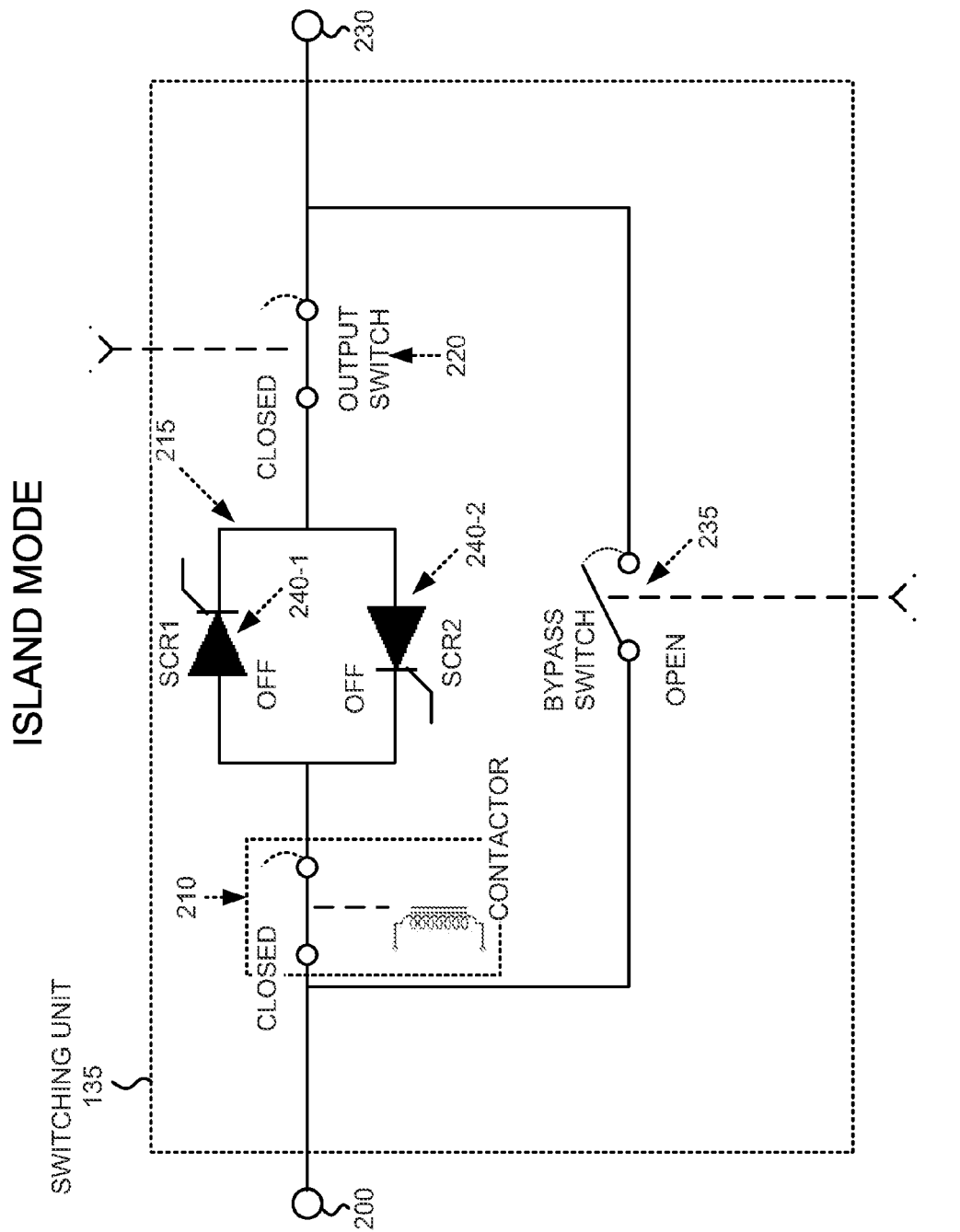
FIG. 4 is a diagram that depicts the switching unit of FIG. 2 operating during the island operating mode shown in FIG. 3.

FIG. 3 depicts an "island mode" in which utility power source 110 fails to supply power to location 115 (e.g., has an outage), and DE power source 105 continues to supply power to critical load(s) 125, but discontinues supplying power to non-critical load(s) 120 or exporting power to utility power source 110 via switching assembly 130. FIG. 4 depicts switching unit 135 operating during the "island mode" shown in FIG. 3. As can be seen in FIG. 4, in the "island mode," when utility power source 110 is not delivering power to non-critical load(s) 120, but DE power source 105 continues to deliver power to critical load(s) 125, contactor 210 may be in a closed position, output switch 220 may be in a closed position, bypass switch 235 may be in an open position, and SCRs 240-1 and 240-2 may be turned off. With contactor 210 in a closed position, output switch 220 in a closed position, bypass switch 235 in an open position, and SCRs 240-1 and 240-2 turned off, power may not flow from DE power source 105 through switch unit 135 and, therefore, DE power source 105 may be isolated from non-critical load(s) 120 and utility power source 110, and utility power source 110 may be isolated from critical load(s) 125.

Figure 5:
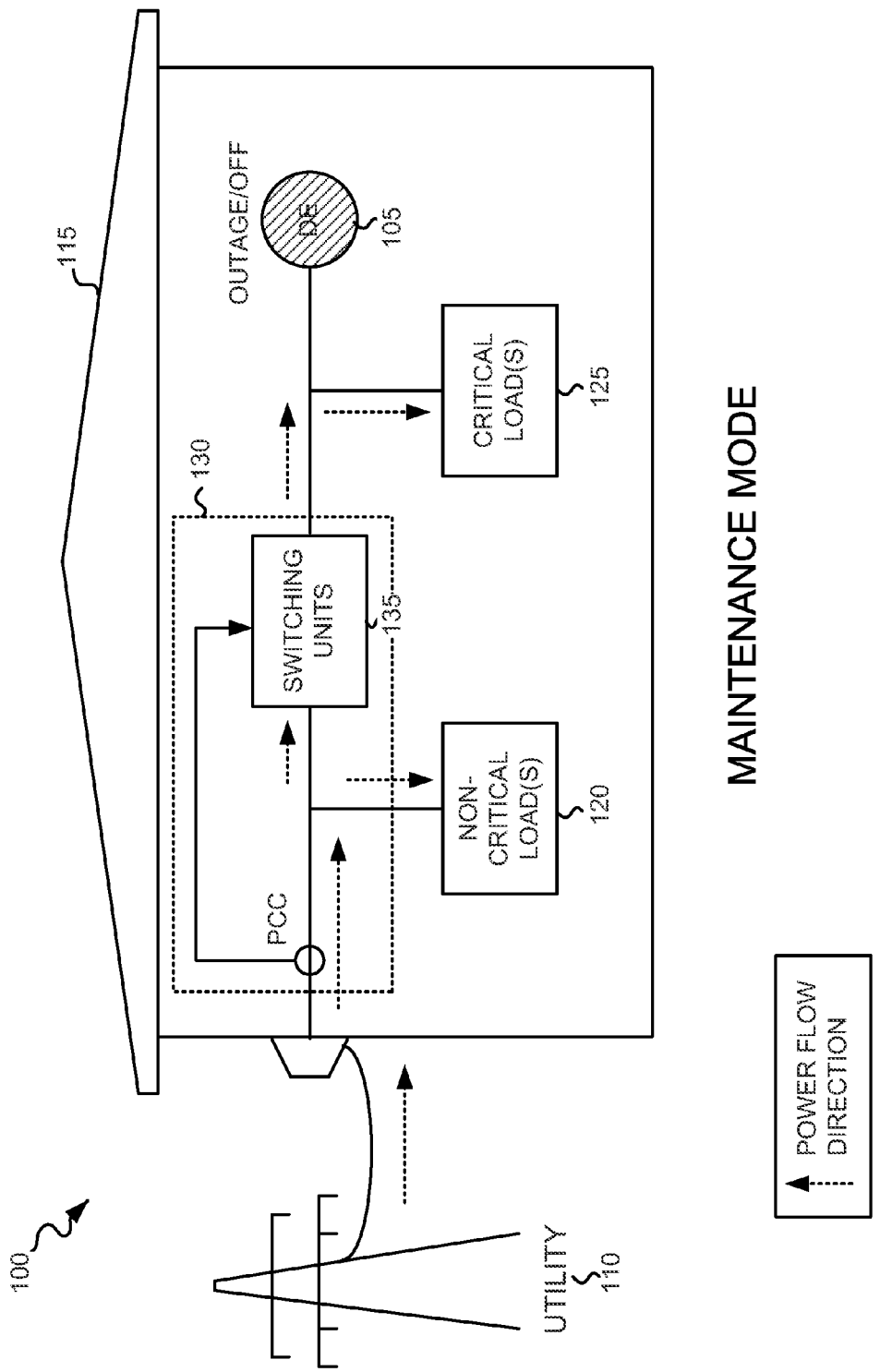
FIG. 5 is a diagram that depicts a "maintenance" operating mode where the distributed energy power source has either had an outage or has been turned off, and the switching units switch to cause the utility power source to deliver power to the critical load(s) of the business or residential location.
Figure 6:
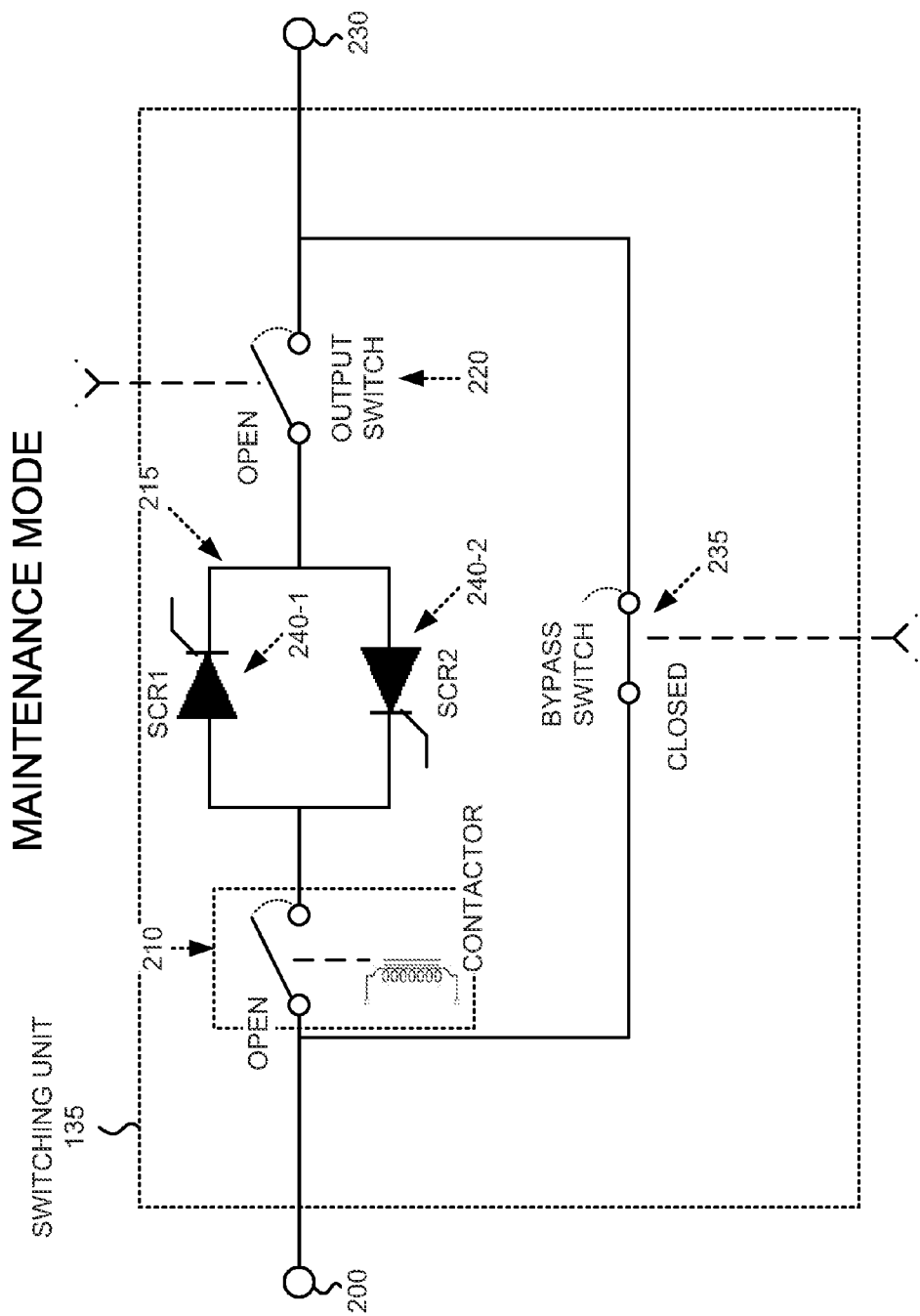
FIG. 6 is a diagram that depicts a switching unit operating during the "maintenance" operating mode shown in FIG. 5, during which utility power source supplies power to the non-critical load(s) and to the critical load(s)

FIG. 5 depicts a "maintenance mode" in which utility power source 110 delivers power to location 115, but DE power source 105 has either had an outage or has been turned off, and is no longer delivering power to critical load(s) 125 and no longer exports power to utility power source 110. DE power source 105 may be turned off, or switched such that it is not supplying power to switching units 135, in a situation where maintenance is being performed on the components of switching units 135 (e.g., SCRs 240-1 and/or 240-2). FIG. 6 depicts switching unit 135 operating during the "maintenance mode" shown in FIG. 5, during which utility power source 110 supplies power to non-critical load(s) 120 and critical load(s) 125 due to DE power source 105 having an outage or being turned off or due to maintenance being performed on components of switching units 135. As can be seen in FIG. 6, in the "maintenance mode," when DE power source 105 discontinues supplying power to critical load(s) 125, but utility power source 110 continues to supply power, contactor 210 may be in an open position, output switch 220 may be in an open position, and bypass switch 235 may be in a closed position. With bypass switch 235 in a closed position, power may flow from utility power source 110 through switching unit 135, bypassing the series connected contactor 210, SCR bridge 215 and output switch 220, to critical load(s) 125.

Figure 7:
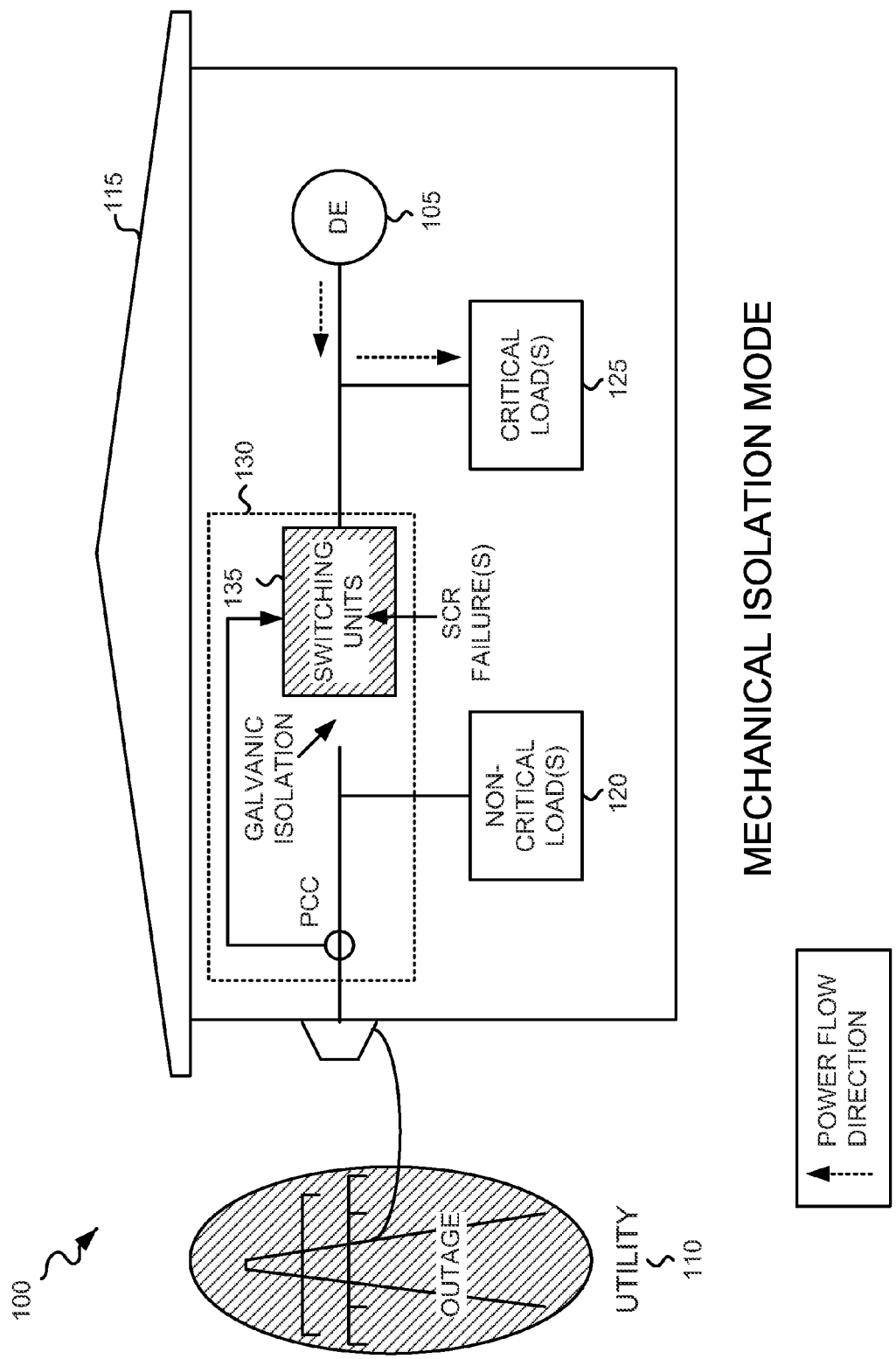
FIG. 7 is a diagram that depicts an optional "mechanical isolation mode" in which the distributed energy source is mechanically isolated from the non-critical load(s) and the utility power source 110 such that the distributed energy power source only supplies power to the critical load(s)

FIG. 7 depicts an optional "mechanical isolation mode" in which DE power source 105 is mechanically isolated from non-critical load(s) 120 and utility power source 110 such that DE power source 105 only supplies power to critical load(s) 125. The "mechanical isolation mode" of FIG. 7 may alternatively occur, instead of the "island mode" of FIGS. 3 and 4, when there is an outage of utility power source 110. Additionally, the "mechanical isolation mode" of FIG. 7 may occur in an instance when either or both of SCRs 240-1 or 240-2 of SCR bridge 215 fails (e.g., short).

Figure 8:
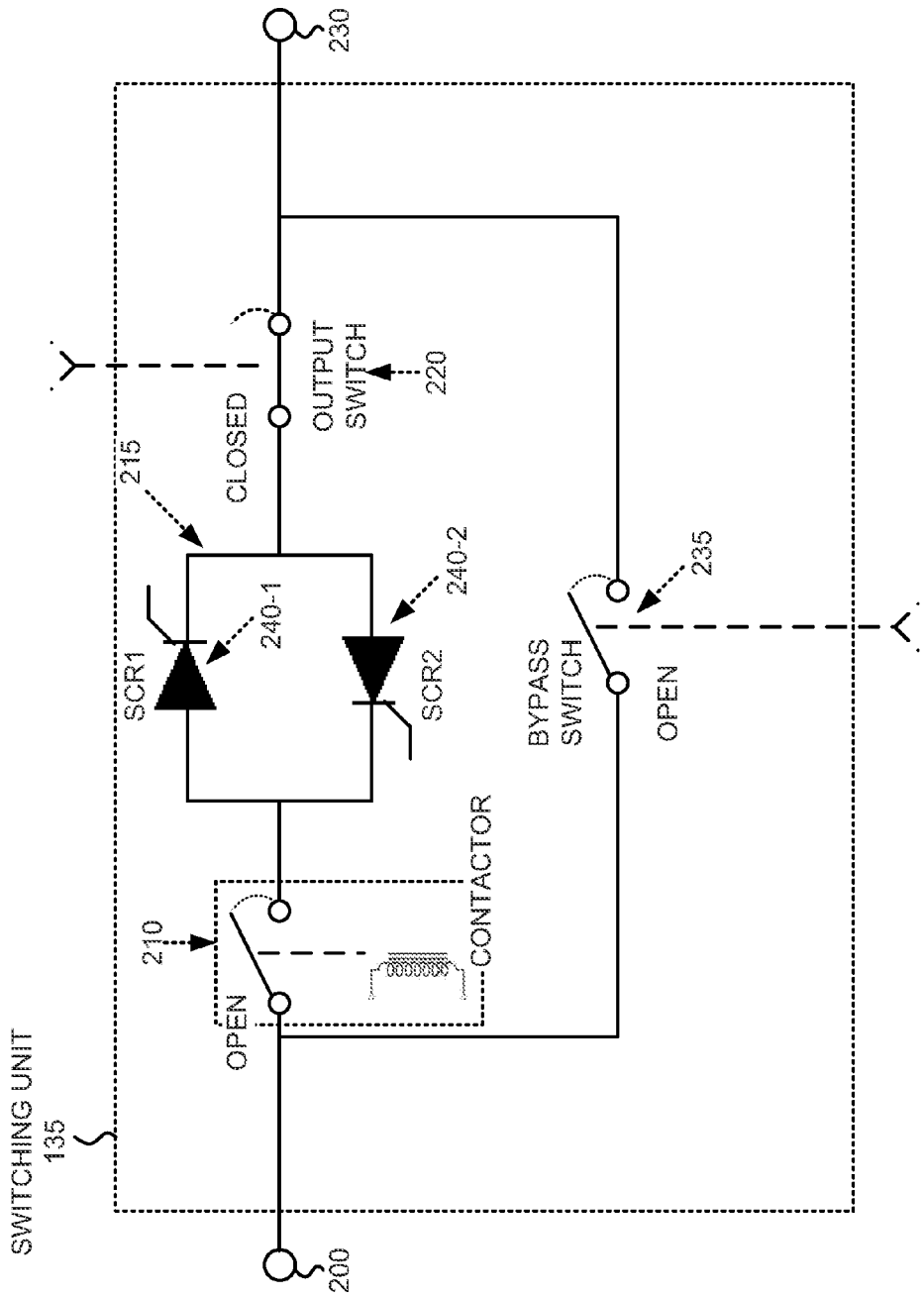
FIG. 8 depicts a switching unit operating during the "mechanical isolation mode" shown in FIG. 7.

FIG. 8 depicts switching unit 135 operating during the "mechanical isolation mode" shown in FIG. 7. As can be seen in FIG. 8, in the "mechanical isolation mode," when utility power source 110 is not delivering power to non-critical load(s) 120, or when any SCR 240 of switching units 135 fails, and DE power source 105 continues to deliver power to critical load(s) 125, contactor 210 may be in an open position and bypass switch 235 may be in an open position. With contactor 210 in an open position and bypass switch 235 in an open position, power may not flow from DE power source 105 through switching unit 135. The opening of contactor 210 mechanically isolates DE power source 105 from utility power source 110, thereby preventing the back-feeding of power from DE power source 105 into the utility power grid (which may endanger line workers working in the utility grid). The mechanical isolation caused by the opening of contactor 210 further isolates DE power source 105 from utility power source 110, thereby preventing an outage of DE power source 105, due to a shorted SCR 240 occurring when an outage of utility power source 110 also occurs. If any SCR 240 of SCR bridge 215 shorts during an outage of utility power source 110, the supply of power from DE source 105 to the utility grid may cause an outage of DE source 105.

Figure 9A:
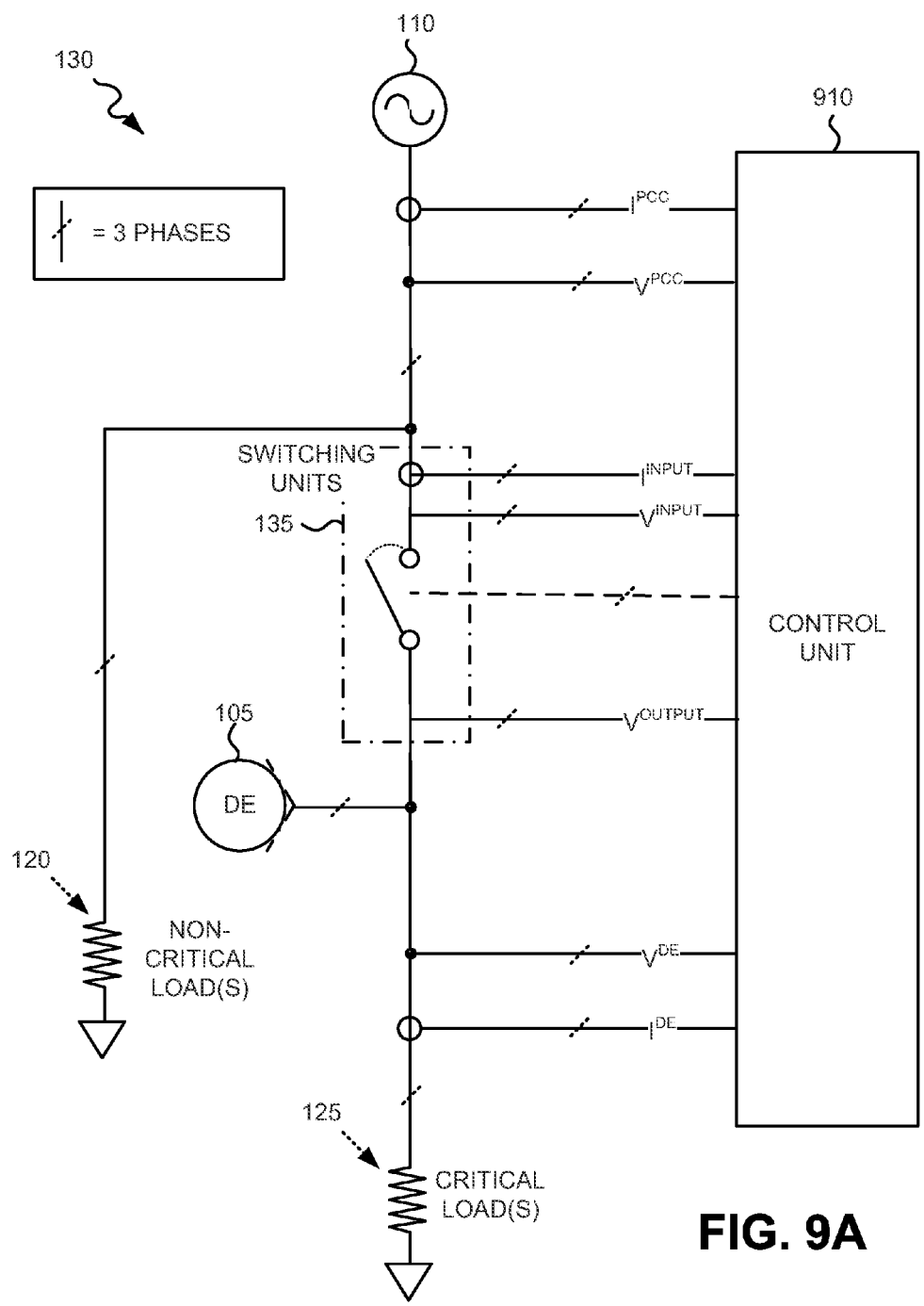
FIGS. 9A, 9B, 9C and 9D are diagrams that depict exemplary details of the switching assembly of FIG. 1 and its interconnection with the utility power source, the distributed energy power source, the non-critical load, and the critical load.

FIGS. 9A, 9B, 9C and 9D are diagrams that depict exemplary details of switching assembly 130 and its interconnection with utility power source 110, DE power source 105, non-critical load(s) 120 and critical load(s) 125. FIG. 9A shows a simplified view of switching assembly 130 that depicts interconnections which are aggregations of the three phases present in FIG. 9C. As shown in FIG. 9A, utility power source 110 connects to a first side (e.g., to a point of common coupling (PCC)) of switching units 135 and to non-critical load(s) 120. Control unit 910 of switching assembly 130 further includes current taps, on the first side of switching units 135, to measure currents $I^{PCC}$ supplied by utility power source 110 (and/or DE power source 105) to non-critical load(s) 120 and switching units 135, and connections, on the first side of switching units 135, to measure voltages ($V^{PCC}$) supplied by utility power supply 110 (or DE power source 105). Control unit 910 additionally includes connections, on a second side of switching units 135, to measure voltages ($V^{DE}$) supplied by DE power source 105 (or utility power source 110), and additional current taps, on the second side of switching units 135, to measure currents $I^{DE}$ supplied by DE power source 105 (and/or by utility power supply 110). Control unit 910 may selectively control the switching of switching units 135 to operate switching assembly 130 in the normal, island, maintenance, or mechanical isolation modes described above with respect to FIGS. 1-8.

Figure 9B:
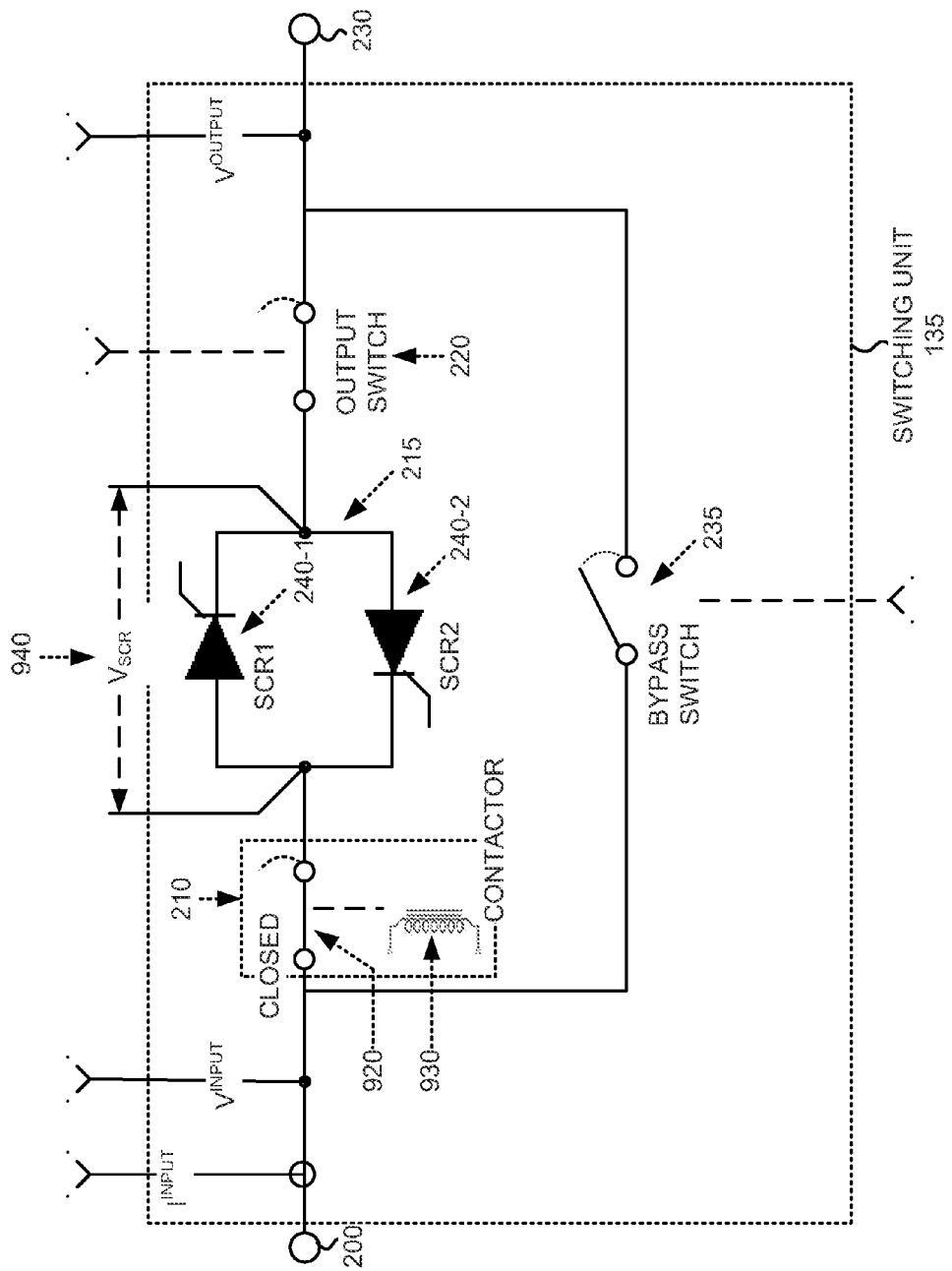

FIG. 9B depicts further details of switching unit 135, with current and voltage measuring connections at the input and output of switching unit 135. As shown in FIG. 9B, a current measuring tap $I^{INPUT}$ and a voltage measuring connection $V^{INPUT}$ may be connected between input terminal 200 and contactor 210. Current measuring tap $I^{INPUT}$ may measure current flowing through switching unit 135, and voltage measuring connection $V^{INPUT}$ may measure the voltage present at input terminal 200 of switching unit 135. As further shown in FIG. 9B, switching unit 135 may include a voltage measuring connection $V^{OUTPUT}$ connected between output switch 220 and output terminal 230. Voltage measuring connection $V^{OUTPUT}$ may measure the voltage present at output terminal 235 of switching unit 135. Current measuring tap $I^{INPUT}$ and voltage measuring connections $V^{INPUT}$ and $V^{OUTPUT}$ may connect to control unit 910 of switching unit such that control unit 910 may monitor the measured current and voltages present within switching unit 135. As additionally shown in FIG. 9B, voltage measuring connections on each side of SCR bridge 215 may permit the measurement of a voltage drop $V_{SCR}$ 940 across SCR bridge 215. Measurement of $V_{SCR}$ 940 permits a determination of a failure of SCR1 240-1 and/or SCR2 240-2 of SCR bridge 215. FIG. 9B further depicts details of contactor 210. As shown, contactor 210 includes a relay switch 920 and a coil 930. Application of control signals to coil 930 causes relay switch 920 to open or close.

Figure 9C:
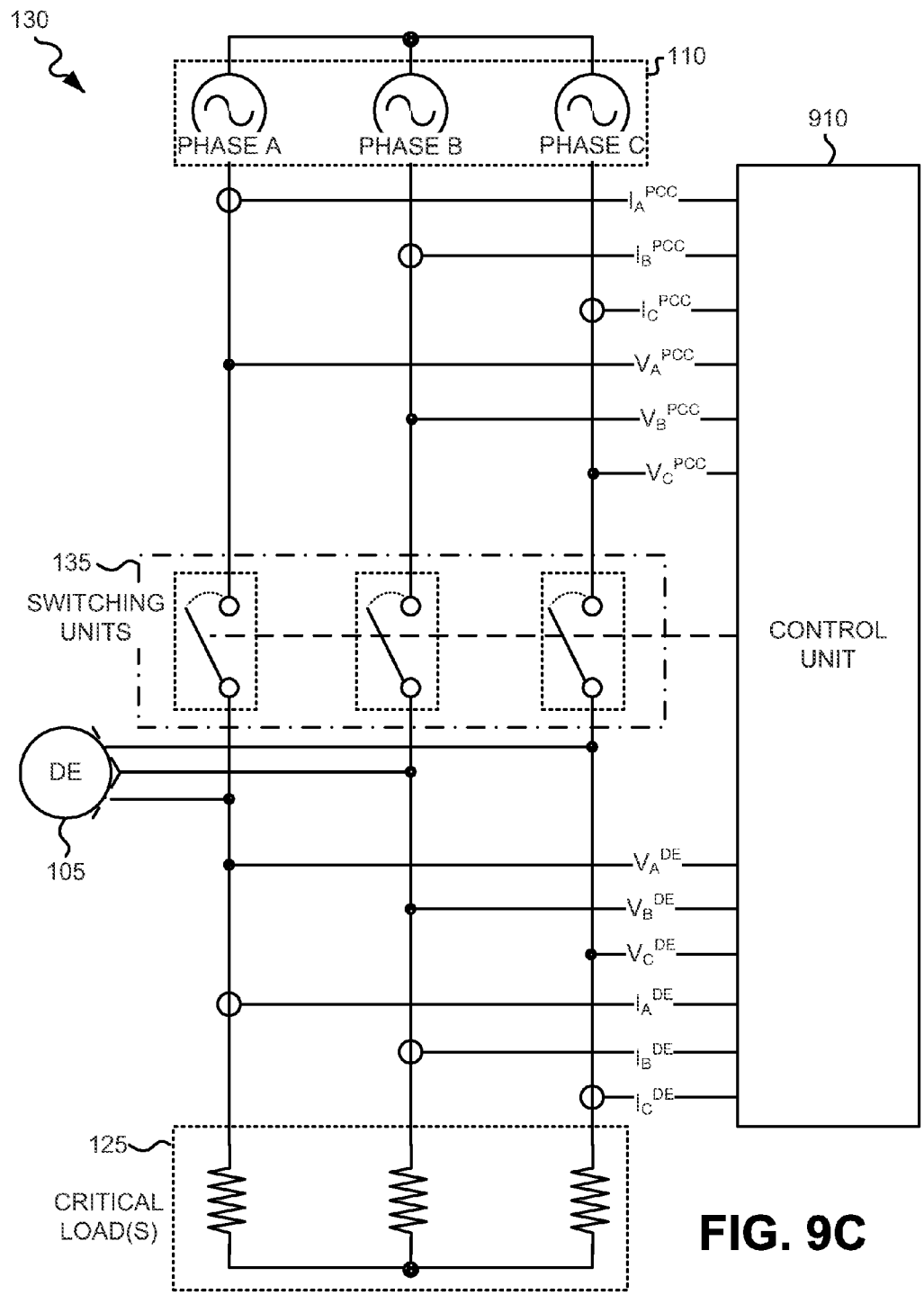

FIG. 9C depicts switching assembly 130 of FIG. 9A, with further detail of the interconnections between control unit 910 and the three different phases of power. FIG. 9C, for the sake of simplicity, omits showing the interconnection of non-critical load(s) 120 on the first side of switching units 135, and further omits showing current measuring tap $I^{INPUT}$, voltage measuring connections $V^{INPUT}$ and $V^{OUTPUT}$, and the voltage drop $V_{SCR}$ across SCR bridge 215, of switching unit 135. As shown in FIG. 9C, control unit 910 includes a current tap on each phase (e.g., phase A, phase B, and phase C) on a first side of switching units 135 to measure a respective current $I_A^{PCC}$, $I_B^{PCC}$, and $I_C^{PCC}$. Currents $I_A^{PCC}$, $I_B^{PCC}$, and $I_C^{PCC}$ represent the three phases of current being supplied to switching assembly 130 and non-critical load(s) 120 by utility power source 110. Control unit 910 further has a connection to each phase on the first side of switching units 135 to measure a respective voltage $V_A^{PCC}$, $V_B^{PCC}$, and $V_C^{PCC}$. Voltages $V_A^{PCC}$, $V_B^{PCC}$, and $V_C^{PCC}$ represent the three phases of voltages being applied to switching assembly 130 and non-critical load(s) 120 by utility power source 110. As further shown in FIG. 9C, control unit 910 includes a current tap on each phase on a second side of switching units 135 to measure a respective current $I_A^{DE}$, $I_B^{DE}$, and $I_C^{DE}$. Currents $I_A^{DE}$, $I_B^{DE}$, and $I_C^{DE}$ represent the three phases of current being supplied to critical load(s) 125 by DE power source 105. Control unit 910 additionally has a connection to each phase on the second side of switching units 135 to measure a respective voltage $V_A^{DE}$, $V_B^{DE}$ and $V_C^{DE}$. Voltages $V_A^{DE}$, $V_B^{DE}$ and $V_C^{DE}$ represent the three phases of voltages being applied to non-critical load(s) 120 by DE power source 105, or by utility power source 110 via switching units 135.

Figure 9D:
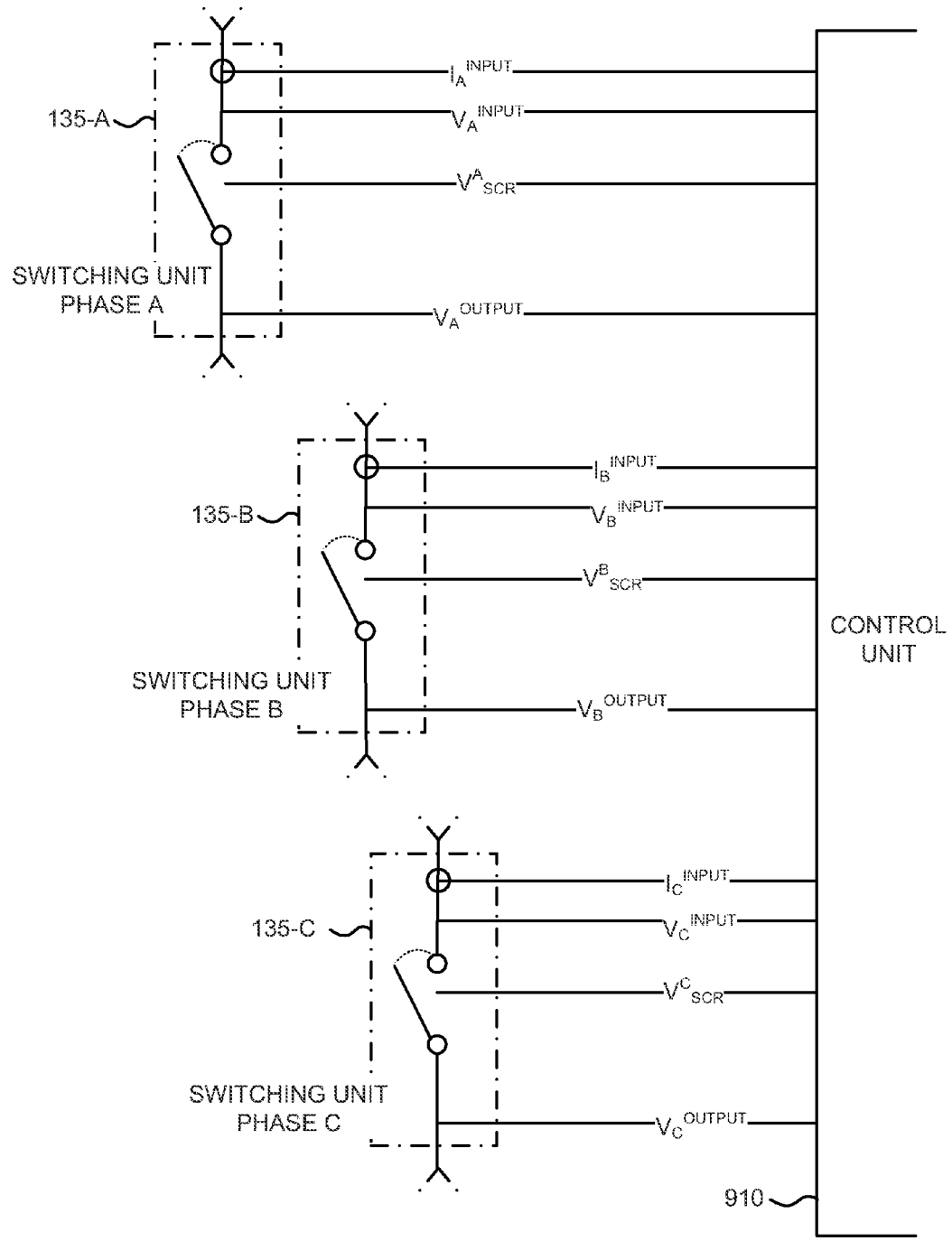

FIG. 9D depicts the interconnection of control unit 910 to switching units 135-A through 135-C associated with each phase A, B, and C of power sources 105 and 110. As shown in FIG. 9D, current measuring tap $I_A^{INPUT}$ and voltage measuring connection $V_A^{INPUT}$, are connected to the input side of switching unit 135-A for measuring the current and voltage of phase A at the input to switching unit 135-A. As further depicted in FIG. 9D, voltage measuring connection $V_A^{OUT}$-

$PUT$ is connected to the output side of switching unit 135-A for measuring the voltage of phase A at the output to switching unit 135-A. The measured voltage drop ($V^A_{SCR}$) across SCR bridge 215 of switching unit 135-A is further shown in FIG. 9D.

As also shown in FIG. 9D, current measuring tap $I_B^{INPUT}$ and voltage measuring connection $V_B^{INPUT}$, are connected to the input side of switching unit 135-B for measuring the current and voltage of phase B at the input to switching unit 135-13. As further depicted in FIG. 9D, voltage measuring connection $V_B^{OUTPUT}$ is connected to the output side of switching unit 135-B for measuring the voltage of phase B at the output to switching unit 135-B. The measured voltage drop ($V^A_{SCR}$) across SCR bridge 215 of switching unit 135-B is further shown in FIG. 9D.

As additionally shown in FIG. 9D, current measuring tap $I_C^{INPUT}$ and voltage measuring connection $V_C^{INPUT}$, are connected to the input side of switching unit 135-C for measuring the current and voltage of phase C at the input to switching unit 135-C. As further depicted in FIG. 9D, voltage measuring connection $V_C^{OUTPUT}$ is connected to the output side of switching unit 135-C for measuring the voltage of phase C at the output to switching unit 135-C. The measured voltage drop ($V^A_{SCR}$) across SCR bridge 215 of switching unit 135-C is further shown in FIG. 9D.

Figure 10:
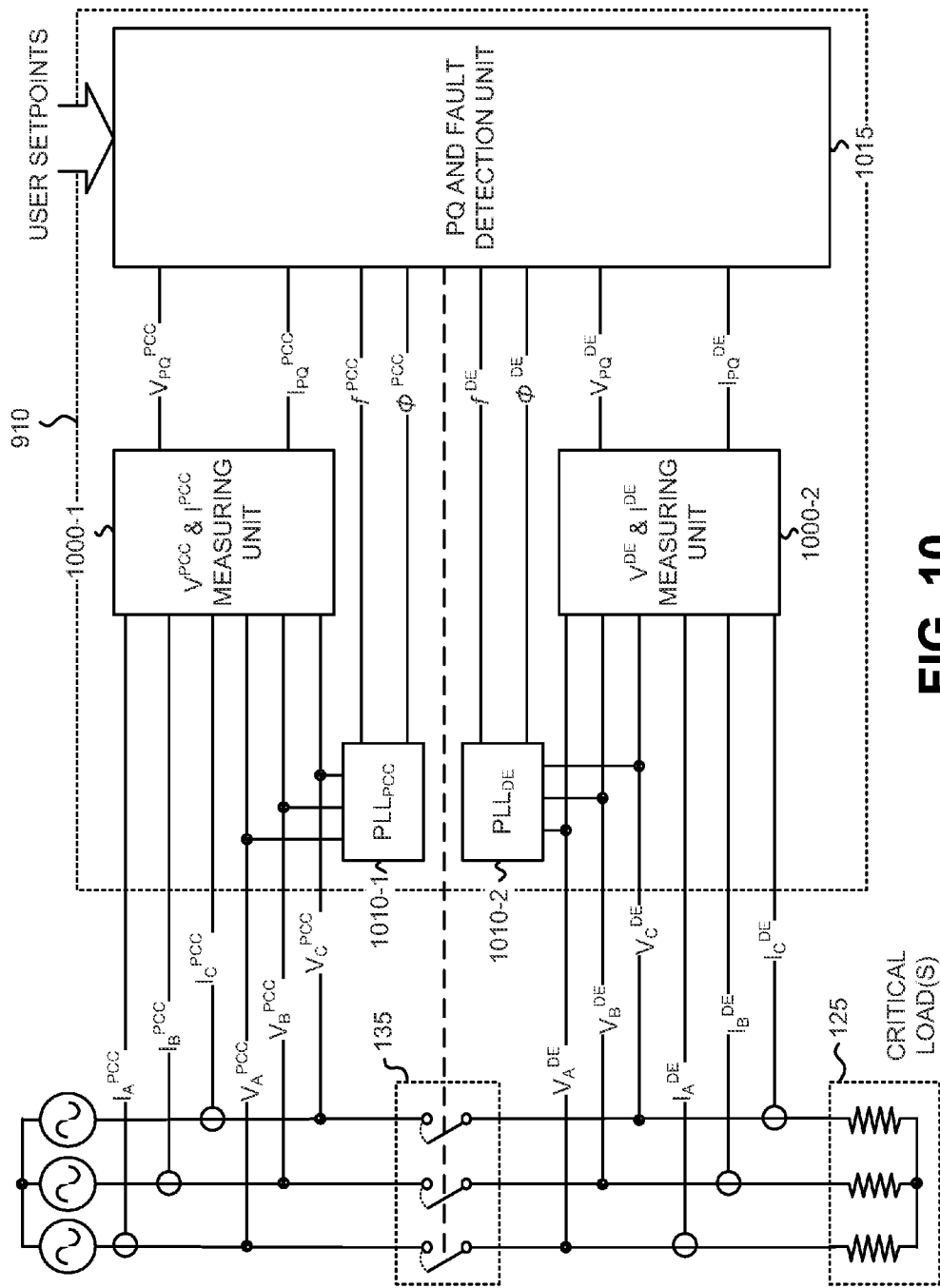
FIG. 10 depicts exemplary components of the control unit of the switching assembly of FIGS. 9A, 9B, 9C and 9D.

FIG. 10 depicts exemplary components of control unit 910 of switching assembly 130. Control unit 910 may include voltage (V) and current (I) measuring units 1000-1 and 1000-2, phase locked loops (PLLs) 1010-1 and 1010-2 and a power quality (PQ) and fault detection unit 1015. Measuring unit 1000-1 may measure the root-mean-square (RMS) of the three phase currents, and the three phase voltages, at the point of common coupling (PCC) between utility power source 110, non-critical load(s) 120 and switching assembly 130. As shown in FIG. 10, measuring unit 1000-1 includes three current taps to measure the RMS of $I_A^{PCC}$, $I_B^{PCC}$ and $I_C^{PCC}$. Measuring unit 1000-1 further includes three connections for measuring the RMS of $V_A^{PCC}$, $V_B^{PCC}$, and $V_C^{PCC}$. Measuring unit 800-1 may, using the RMS measurements of $V_A^{PCC}$, $V_B^{PCC}$, and $V_C^{PCC}$, generate an indication of PCC voltage power quality ($V_{PQ}^{PCC}$) for supplying to PQ and fault detection unit 1015. Measuring unit 1000-1 may, using the RMS measurements of $I_A^{PCC}$, $I_B^{PCC}$ and $I_C^{PCC}$, generate an indication of current power quality ($I_{PQ}^{PCC}$) for supplying to PQ and fault detection unit 1015. Measuring unit 1000-1 may additionally include current taps (not shown) for measuring the RMS of the three phase currents $I_A^{INPUT}$, $I_B^{INPUT}$, and $I_C^{INPUT}$, and connections for measuring the RMS of the three phase voltages $V_A^{INPUT}$, $V_B^{INPUT}$ and $V_C^{INPUT}$ present at the inputs to switching units 135-A through 135-C. Measuring unit 1000-2 may additionally include connections for measuring the RMS of the three phase voltages $V_A^{OUTPUT}$, $V_B^{OUTPUT}$ and $V_C^{OUTPUT}$ present at the outputs to switching units 135-A through 135-C.

Measuring unit 1000-2 may measure three phase currents, and three phase voltages, at DE power source 105 (not shown in FIG. 10). As shown in FIG. 10, measuring unit 1000-1 includes three current taps to measure the RMS of $I_A^{DE}$, $I_B^{DE}$, and $I_C^{DE}$. Measuring unit 1000-2 further includes three connections for measuring the RMS of $V_A^{DE}$, $V_B^{DE}$, and $V_C^{DE}$. Measuring unit 1000-1 may, using the RMS measurements of $V_A^{DE}$, $V_B^{DE}$, and $V_C^{DE}$, generate an indication of voltage power quality ($V_{PQ}^{DE}$) of DE power source 105 for supplying to PQ and fault detection unit 1015. Measuring unit 1000-1 may, using the RMS measurements of $I_A^{DE}$, $I_B^{DE}$ and $I_C^{DE}$, generate an indication of current power quality ($I_{PQ}^{DE}$) for supplying to PQ and fault detection unit 1015.

PLL 1010-1 may include three connections for detecting voltages $V_A^{PCC}$, $V_B^{PCC}$, and $V_C^{PCC}$. PLL 1010-1 may generate an indication of frequency ($f_{PCC}$) and phase ($\phi_{PCC}$) based on the detected voltages $V_A^{PCC}$, $V_B^{PCC}$, and $V_C^{PCC}$ of utility power source 110. PLL 1010-2 may include three connections for detecting voltages $V_A^{DE}$, $V_B^{DE}$, and $V_C^{DE}$. PLL 1010-2 may generate an indication of frequency ($f_{DE}$) and phase ($\phi_{DE}$) based on the detected voltages $V_A^{DE}$, $V_B^{DE}$, and $V_C^{DE}$ of DE power source 105. PLL 1010-1 and 1010-2 may include phase-locked loop circuitry for generating output signals (e.g., frequency (f) and phase ($\phi$)) related to the frequency and phase of the input voltage signals (e.g., $V_A$, $V_B$, and $V_C$).

PQ and fault detection unit 1015 may receive user set point values, indications of voltage power quality ($V_{PQ}^{PCC}$ and $V_{PQ}^{DE}$) and current power quality ($I_{PQ}^{PCC}$ and $I_{PQ}^{DE}$) from measuring units 1000-1 and 1000-2, and indications of frequency ($f_{PCC}$ and $f_{DE}$) and phase ($\phi_{PCC}$ and $\phi_{DE}$)) from PLLs 1010-1 and 1010-2. PQ and fault detection unit 1015 may control the opening and closing of contactor 210, output switch 220 and bypass switch 235, and the turning on and turning off of SCR1 240-1 and SCR2 240-2 of SCR bridge 215 of each switching unit 135, based on the received user set point values (e.g., threshold or limit values), and based on the indications of voltage power quality, current power quality, frequency and phase received from measuring units 1000-1 and 1000-2 and PLLs 1010-1 and 1010-2. PQ and fault detection unit 1015 may disconnect DE power source 105 from utility power source 110 based on, for example, the detection of various events, including under/over voltage or under/over frequency of utility power source 110, zero and/or negative sequence fault currents, phase instantaneous over-currents, phase time over-currents and the failure of any of the SCRs of SCR bridge 215.

Figure 11:
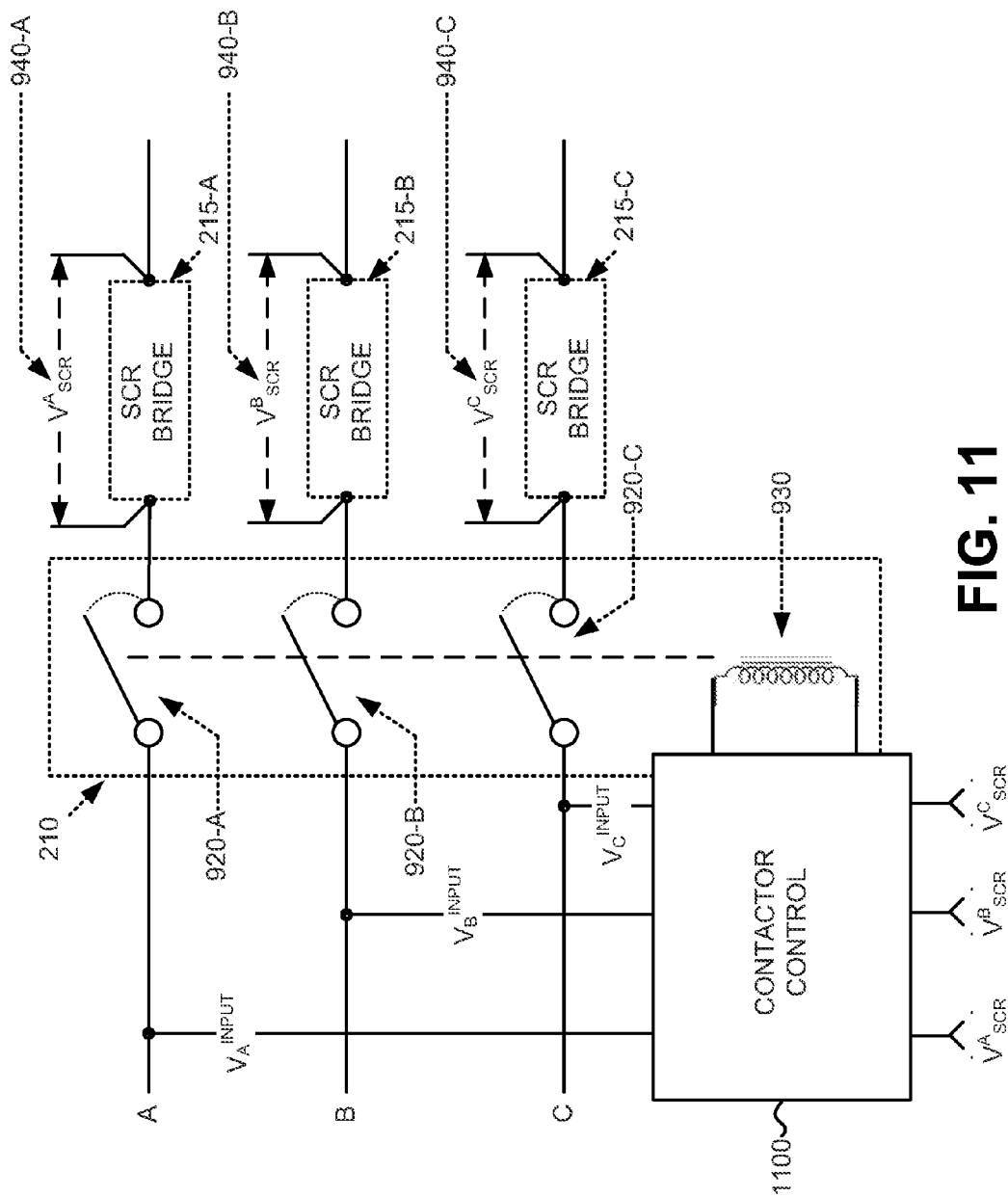
FIG. 11 depicts further details of exemplary components involved with the opening and closing of the contactor of the switching units based on outages of utility power source 110 and/or based on failures of the SCRs of the switching units.

FIG. 11 depicts further details of exemplary components involved with the opening and closing of contactor 210 of switching units 135 based on outages of utility power source 110 and/or based on failures of the SCRs of switching units 135. As shown in FIG. 11, a single contactor 210, shown previously with only a single phase's portion of contactor 210, includes relay switches 920-A, 920-B and 920-C, and contactor coil 930. Relay switch 920-A connects in series with the phase A voltage input of utility power source 110 ($V_A^{INPUT}$) and with SCR bridge 215-A. Relay switch 920-B connects in series with the phase B voltage input of utility power source 110 ($V_B^{INPUT}$) and with SCR bridge 215-B. Relay switch 920-C connects in series with the phase C voltage input of utility power source 110 ($V_C^{INPUT}$) and with SCR bridge 215-C. FIG. 11 further depicts measurements of the voltage drop $V_A^{SCR}$ 940-A across SCR bridge 215-A, the voltage drop $V_B^{SCR}$ 940-B across SCR bridge 215-B, and the voltage drop $V_C^{SCR}$ 940-C across SCR bridge 215-C. As shown in FIG. 11, in one exemplary implementation, contactor control 1100, which connects to contactor coil 930 of contactor 210, receives the three phase voltages $V_A^{INPUT}$, $V_B^{INPUT}$ and $V_C^{INPUT}$, and the three voltage drops measured across $V_A^{SCR}$ 940-A, $V^B_{SCR}$ 940-B, and $V^C_{SCR}$ of SCR bridges 215-A, 215-B and 215-C. Based on these voltages, contactor control 1100 applies control signals to contactor coil 930 to cause relay switches 920-A, 920-B and 920-C to open or close. For example, if any of the three phase voltages $V_A^{INPUT}$, $V_B^{INPUT}$ and $V_C^{INPUT}$ fall below a voltage threshold (e.g., indicating an outage of utility power source 110), then contactor control 1100 may cause relay switches 920-A, 920-B and 920-C to open, thus, mechanically isolating DE source 105 from utility power source 110. As another example, if any of the measured voltage drops $V_A^{SCR}$ 940-A, $V_B^{SCR}$ 940-B, and $V_C^{SCR}$ 940-C across SCR bridges 215-A, 215-B and 215-C indicates an SCR failure (e.g., a shorted SCR), then contactor control 110 may cause relay switches 920-A, 920-B and 920-C to open to mechanically isolate DE source 105 from utility power source 110. Contactor control 1100 may be implemented by control unit 910 (e.g., by a digital processing unit), or by analog circuitry. In another exemplary implementation, PQ and fault detection unit 1015 may measure the voltage drops $V_A^{SCR}$ 940-A, $V_B^{SCR}$ 940-B, and $V_C^{SCR}$ 940-C across SCR bridges 215-A, 215-B and 215-C and the three phase voltages $V_A^{INPUT}$, $V_B^{INPUT}$ and $V_C^{INPUT}$. In this implementation, unit 1015 may provide signals to contactor control 1100 that serve as a basis for contactor control 1100 opening or closing relays 920-A, 920-B and 920-C of contactor 210. In a further implementation, contactor control 1100 and unit 1015 may provide redundant measurements of the voltage drops $V_A^{SCR}$ 940-A, $V_B^{SCR}$ 940-B, and $V_C^{SCR}$ 940-C across SCR bridges 215-A, 215-B and 215-C and/or the three phase voltages $V_A^{INPUT}$, $V_B^{INPUT}$ and $V_C^{INPUT}$. In this implementation, both contactor control 1100 and unit 1015 may measure these voltages and may independently cause the relays 920-A, 920-B and 920-C to open to cause mechanical isolation. Therefore, in this implementation, unit 1015 may cause the relays 920-A, 920-B and 920-C to open in the event of failure of contactor control 1100 (and vice versa).

Figure 12:
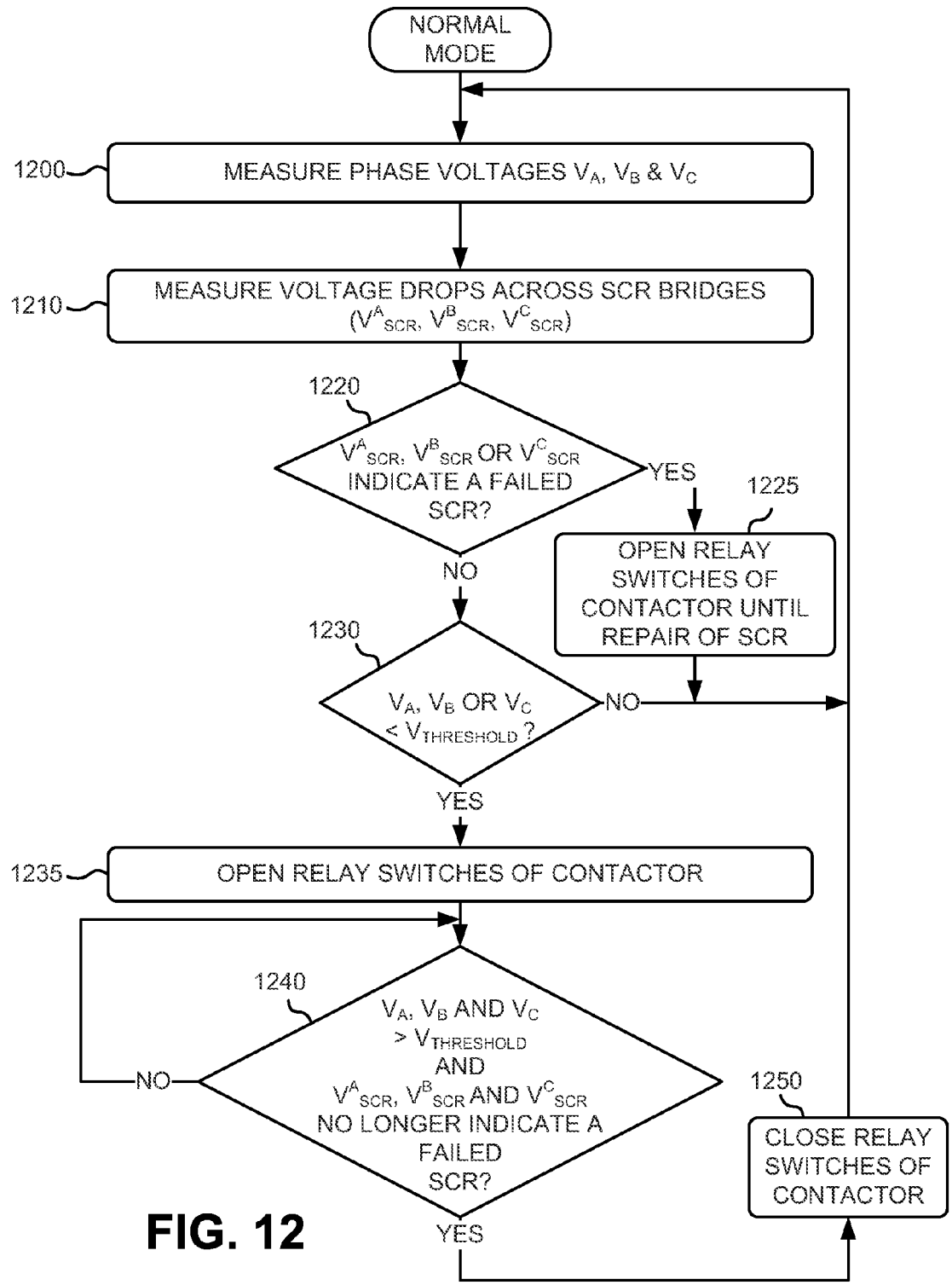
FIG. 12 is a flow diagram that illustrates an exemplary process for controlling the opening and closing of the relay switches of the contactor of FIG. 11 based on phase voltages measured at the input of the switching units and/or based on the detection of failures of SCRs of the SCR bridges of the switching units.

FIG. 12 is a flow diagram that illustrates an exemplary process for controlling the opening and closing of relay switches 920-A, 920-B and 920-C of contactor 210 based on phase voltages measured at the inputs of switching units 135 and/or based on the detection of failures of SCRs of SCR bridges 215-A, 215-B or 215-C of switching units 135. The exemplary process of FIG. 12 may be implemented by contactor control 1100 of FIG. 11. In the exemplary process of FIG. 12, switching units 135 begin in the "normal mode" of FIGS. 1 and 2, with contactor 210 closed, SCR1 240-1 and SCR2 240-2 turned on, output switch 220 closed, and bypass switch 235 open.

The exemplary process may include measuring the phase voltages $V_A$, $V_B$ and $V_C$ (block 1200). Referring to FIG. 11, the phase voltages $V_A^{INPUT}$, $V_B^{INPUT}$ and $V_C^{INPUT}$ at the input terminal 200 of each switching unit 135 may be measured by contactor control 1100. The voltage drops ($V_A^{SCR}$, $V_B^{SCR}$, $V_C^{SCR}$) across SCR bridges 215-A, 215-B and 215-C may be measured (block 1210). Referring again to FIG. 11, the voltage drops $V_A^{SCR}$ 940-A, $V_B^{SCR}$ 940-B, and $V_C^{SCR}$ 940-C across SCR bridges 215-A, 215-B and 215-C may be measured by contactor control 1100.

Contactor control 1100 may determine if any of the voltage drops $V_A^{SCR}$, $V_B^{SCR}$, and $V_C^{SCR}$ indicate that any SCR 240 in SCR bridges 215-A, 215-B or 215-C has failed (block 1220). In one implementation, if any of the voltage drops $V_A^{SCR}$, $V_B^{SCR}$, or $V_C^{SCR}$ measure sufficiently low as to indicate a short, then a SCR of the corresponding SCR bridge 215 can be considered to have failed. If a SCR failure is indicated (YES—block 1220), then contactor control 1100 may open relay switches 920-A, 920-B and 920-C of contactor 210 until the failed SCR is repaired/replaced (block 1225). The relay switches 920-A, 920-B and 920-C may be latched open until the failed SCR(s) is repaired/replaced. Contactor control 1100 may determine that the failed SCR has been repaired via measurement of the voltage drops $V_A^{SCR}$, $V_B^{SCR}$, and/or $V_C^{SCR}$. Alternatively, contactor control 1100 may be manually reset, and relay switches 920-A, 920-B and 920-C permitted to then close, via external manual control once the failed SCR/s) has been repaired. If a SCR failure is not indicated (NO—block 1220), then contactor control 1100 may determine if any of the phase voltages $V_A$, $V_B$ and $V_C$ are less than a threshold voltage ($V_{THRESHOLD}$) (block 1230). If not (NO—block 1230), then the exemplary process may return to block 1200 with the continued measurement of the phase voltages $V_A$, $V_B$ and $V_C$. The threshold voltage ($V_{THRESHOLD}$) may be selectable, and may additionally include a duration (e.g., less than 100 volts for more than 40 ms). If any of the phase voltages $V_A$, $V_B$ and $V_C$ are less than the threshold voltage ($V_{THRESHOLD}$) (YES—block 1230), then contactor control 1100 may open relay switches 920-A, 920-B and 920-C of contactor 210 (block 1235). Opening of relay switches 920-A, 920-B and 920-C mechanically isolates DE source 105 from utility power source 110, thereby preventing back-feeding into the utility grid and possibly preventing an outage of DE source 105 in the event that an SCR has shorted while at the same time there is an outage of utility power source 110.

Contactor control 1100 may determine if the phase voltages $V_A$, $V_B$ and $V_C$ are greater than the threshold voltage ($V_{THRESHOLD}$), and whether the voltage drops $V_A^{SCR}$, $V_B^{SCR}$, and $V_C^{SCR}$ no longer indicate a failure of any SCR 240 in SCR bridges 215-A, 215-B or 215-C (block 1240). If not (NO—block 1240), then the exemplary process may continue to loop at block 1240. If the phase voltages $V_A$, $V_B$ and $V_C$ are greater than the threshold voltage ($V_{THRESHOLD}$) and the voltage drops $V_A^{SCR}$, $V_B^{SCR}$, and $V_C^{SCR}$ no longer indicate a failure of any SCR 240 of SCR bridges 215-A, 215-B or 215-C (YES—block 1240), then contactor control 1100 may close relay switches 920-A, 920-B and 920-C of contactor 210 (block 1250), and the exemplary process may return to block 1200 with the continued measurement of the phase voltages $V_A$, $V_B$ and $V_C$ and the SCr voltage drops $V_A^{SCR}$, $V_B^{SCR}$ and $V_C^{SCR}$. Switching units 135 may, therefore, return to the normal mode once the phase voltages $V_A$, $V_B$ and $V^C$ are exceeding the voltage threshold, and the voltage drops $V_A^{SCR}$, $V_B^{SCR}$, and $V_C^{SCR}$ no longer indicate a failure of any SCR 240 in SCR bridges 215-A, 215-B or 215-C.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIG. 12 the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A switching assembly, comprising:
a first rectifier bridge;
a first contactors, coupled in series with the first rectifier bridge, including a coil and a first relay switch connected via a first direct connection to a first phase of a first voltage source;
a second rectifier bridge;
a second contactors coupled in series with the second rectifier bridge, including, the coil and a second relay switch connected via a second direct connection to a second phase of the first voltage source;
a third rectifier bridge
a third contactor, coupled in series with the third rectifier bridge, including the coil and a third control connected via a third direct connection to a third phase of the first voltage source; and
a control unit configured to selectively apply a control signal to the coil to cause the first relay switch, the second relay switch and the third relay switch to open or close based on voltages measured across one or more of the first, second or third rectifier bridges.

2. The switching assembly of claim 1, wherein, when selectively applying the control signal to the coil to cause the first relay switch, the second relay switch and the third relay switch to open or close, the control unit is further configured to:
cause the first relay switch, the second relay switch and the third relay switch to open when any of the voltages measured across the first, second, or third rectifier bridges indicates a failure in a rectifier of the first, second or third rectifier bridges; and
cause the first relay switch, the second relay switch and the third relay switch to close when the voltages measured across the first, second, and third rectifier bridges do not indicate a failure in a rectifier of the first, second and third rectifier bridges.

3. The switching assembly of claim 1, wherein each of the first, second and third rectifier bridges comprises a first silicon controlled rectifier (SCR) connected in parallel with a second SCR.

4. The switching assembly of claim 1, wherein the first voltage source comprises a utility power source and wherein the switching assembly is coupled between the utility power source and a distributed energy power source.

5. The switching assembly of claim 1, wherein the first rectifier bridge is connected in series between the first relay switch and a first output terminal, wherein the second rectifier bridge is connected in series between the second relay switch and a second output terminal, and wherein the third rectifier bridge is connected in series between the third relay switch and a third output terminal.

6. The switching assembly of claim 5, wherein the first rectifier bridge comprises a first silicon controlled rectifier (SCR) connected in parallel with a second SCR, wherein a cathode of the first SCR is coupled to the first output terminal and an anode of the first SCR is connected to the first relay switch, and wherein a cathode of the second SCR is connected to the first relay switch and an anode of the second SCR is coupled to the first output terminal.

7. The switching assembly of claim 1, wherein the control unit is configured to selectively apply the control signal to the coil to cause the first relay switch, the second relay switch and the third relay switch to open or close based further on a voltage measurement of the first phase of the first voltage source, the second phase of the first voltage source, or the third phase of the first voltage source.

8. The switching assembly of claim 7, wherein, when selectively applying the control signal to the coil to cause the first relay switch, the second relay switch and the third relay switch to open or close, the control unit is further configured to:
cause the first relay switch, the second relay switch, and the third relay switch to open when the voltage measurement of the first phase of the first voltage source, the second phase of the first voltage source, or the third phase of the first voltage source is less than a threshold voltage level; and
cause the first relay switch, the second relay switch, and the third relay switch to close when the voltage measurement of the first phase of the first voltage source, the second phase of the first voltage source, or the third phase of the first voltage source is greater than the threshold voltage level.

9. The switching assembly of claim 5, wherein the first direct connection to the first phase of the first voltage source comprises a first input terminal and wherein a first output switch is connected in series between the first rectifier bridge and the first output terminal,
wherein the second direct connection to the second phase of the first voltage source comprises a second input terminal and wherein a second output switch is connected in series between the second rectifier bridge and the second output terminal, and
wherein the third direct connection to the third phase of the first voltage source comprises a third input terminal and wherein a third output switch is connected in series between the third rectifier bridge and the third output terminal.

10. The switching assembly of claim 9, further comprising:
a first bypass switch connected between the first input terminal and the first output terminal, wherein the first bypass switch is connected in parallel with the first relay switch, and the first rectifier bridge;
a second bypass switch connected between the second input terminal and the second output terminal, wherein the second bypass switch is connected in parallel with the second relay switch, and the second rectifier bridge; and
a third bypass switch connected between the third input terminal and the third output terminal, wherein the third bypass switch is connected in parallel with the third relay switch, and the third rectifier bridge.

11. The switching assembly of claim 10, wherein the first input terminal couples to a first non-critical load and the first output terminal couples to a first critical load,
wherein the second input terminal couples to a second non-critical load and the second output terminal couples to a second critical load, and
wherein the third input terminal couples to a third non-critical load and the third output terminal couples to a third critical load.

12. The switching assembly of claim 1, wherein the control unit, when selectively applying the control signal to the coil, is further configured to:
determine an occurrence of a failure associated with the first, second or third rectifier bridges based on the voltages measured across the one or more of the first, second or third rectifier bridges, and
apply the control signal to the coil to cause the first relay switch, the second relay switch and the third relay switch to open based on the occurrence of the failure.

13. The switching assembly of claim 12, wherein the control unit, when selectively applying the control signal to the coil, is further configured to:
- determine, subsequent to the occurrence of the failure associated with the first, second or third rectifier bridges, whether the first rectifier bridge, the second rectifier bridge or the third rectifier bridge has been repaired, and
- cause the first relay switch, the second relay switch and the third relay switch to be latched open based on the determination of whether the first rectifier bridge, the second rectifier bridge or the third rectifier bridge has been repaired.

14. The switching assembly of claim 13, wherein the control unit, when determining whether the first rectifier bridge, the second rectifier bridge or the third rectifier bridge has been repaired, is further configured to:
- measure voltages across the first, second and third rectifier bridges, and
- determine whether the first rectifier bridge, the second rectifier bridge or the third rectifier bridge has been repaired based on the measured voltages across the first, second and third rectifier bridges.

15. The switching assembly of claim 13, wherein the control unit, when determining whether the first rectifier bridge, the second rectifier bridge or the third rectifier bridge has been repaired, is further configured to:
- receive, once the first rectifier bridge, the second rectifier bridge or the third rectifier bridge has been repaired, a manual reset, and
- cause the first relay switch, the second relay switch and the third relay switch to close based on the manual reset.

16. The switching assembly of claim 12, wherein the control unit, when selectively applying the control signal to the coil, is further configured to:
- determine a voltage level of the first phase, the second phase and the third phase of the first voltage source,
- determine when the voltage level of the first phase, the second phase or the third phase of the first voltage source becomes less than a threshold voltage, and
- cause the first relay switch, the second relay switch, and the third relay switch to open when the voltage level of the first phase, the second phase or the third phase of the first voltage source becomes less than the threshold voltage.

17. The switching assembly of claim 16, wherein the control unit, when selectively applying the control signal to the coil, is further configured to:
- determine, subsequent to causing the first relay switch, the second relay switch and the third relay switch to open, when current voltages measured across the first, second and third rectifier bridges no longer indicate the occurrence of the failure associated with the first, second or third rectifier bridges,
- determine, subsequent to causing the first relay switch, the second relay switch and the third relay switch to open, a voltage level of the first phase, the second phase and the third phase of the first voltage source,
- determine when the voltage level of the first phase, the second phase and the third phase of the first voltage source becomes greater than or equal to the threshold voltage, and
- cause the first relay switch, the second relay switch, and the third relay switch to close when the voltage level of the first phase, the second phase and the third phase of the first voltage source becomes greater than or equal to the threshold voltage and when the voltages measured across the first, second and third rectifier bridges no longer indicate the occurrence of the failure associated with the first, second or third rectifier bridges.

18. A switching assembly, comprising:
- a first rectifier bridge;
- a first contactor, coupled in series with the first rectifier bridge, including a coil and a first relay switch connected via a first direct connection to a first phase of a first voltage source, wherein the first voltage source comprises a utility power source and wherein the switching assembly is coupled between the utility power source and a distributed energy power source;
- a second rectifier bridge;
- a second contactor, coupled in series with the second rectifier bridge, including the coil and a second relay switch connected via a second direct connection to a second phase of the first voltage source;
- a third rectifier bridge, wherein each of the first, second and third rectifier bridges comprises a first silicon controlled rectifier (SCR) connected in parallel with a second SCR;
- a third contactor, coupled in series with the third rectifier bridge, including the coil and a third relay switch connected via a third direct connection to a third phase of the first voltage source; and
- a control unit configured to selectively apply a control signal to the coil to cause the first relay switch, the second relay switch and the third relay switch to open or close based on voltages measured across one or more of the first, second or third rectifier bridges.

19. A switching assembly, comprising:
- a first rectifier bridge;
- a first contactor, coupled in series with the first rectifier bridge, including a coil and a first relay switch connected via a first direct connection to a first phase of a first voltage source, wherein the first voltage source comprises a utility power source and wherein the switching assembly is coupled between the utility power source and a distributed energy power source;
- a second rectifier bridge;
- a second contactor, coupled in series with the second rectifier bridge, including the coil and a second relay switch connected via a second direct connection to a second phase of the first voltage source;
- a third rectifier bridge;
- a third contactor, coupled in series with the third rectifier bridge, including the coil and a third relay switch connected via a third direct connection to a third phase of the first voltage source; and
- a control unit configured to selectively apply a control signal to the coil to cause the first relay switch, the second relay switch and the third relay switch to open or close based on voltages measured across one or more of the first, second or third rectifier bridges and further based on a voltage measurement of the first phase of the first voltage source, the second phase of the first voltage source, or the third phase of the first voltage source.

20. The switching assembly of claim 19, wherein, when selectively applying the control signal to the coil to cause the first relay switch, the second relay switch and the third relay switch to open or close, the control unit is further configured to:
- cause the first relay switch, the second relay switch, and the third relay switch to open when the voltage measurement of the first phase of the first voltage source, the second phase of the first voltage source, or the third phase of the first voltage source is less than a threshold voltage; and cause the first relay switch, the second relay switch, and the third relay switch to close when the voltage measurement of the first phase of the first voltage source, the second phase of the first voltage source, or the third phase of the first voltage source is greater than the threshold voltage.

\* \* \* \* \*

UNITED STATES PATENT AND TRADEMARK OFFICE
CERTIFICATE OF CORRECTION

PATENT NO. : 9,190,871 B2  
APPLICATION NO. : 13/479867  
DATED : November 17, 2015  
INVENTOR(S) : Hans-Erik Pfitzer Page 1 of 1

It is certified that error appears in the above-identified patent and that said Letters Patent is hereby corrected as shown below:

Claims

Claim 1, at column 11, line 4 should read: "a first contactor, coupled in series with the first rectifier"

Claim 1, at column 11, lines 9-10 should read: "a second contactor, coupled in series with the second rectifier bridge, including the coil and a second relay"

Claim 1, at column 11, line 13 should read: "a third rectifier bridge;"

Claim 1, at column 11, line 15 should read: "bridge, including the coil and a third relay switch connected"

Signed and Sealed this  
Fifth Day of April, 2016

Michelle K. Lee  
*Director of the United States Patent and Trademark Office*